United States Patent [19]
Hofer et al.

[11] Patent Number: 6,056,097
[45] Date of Patent: May 2, 2000

[54] VISCOUS COUPLING

[75] Inventors: Manfred Hofer, Gais; Rudolf Morawetz, Bruneck, both of Italy

[73] Assignee: GKN ViscoDrive GmbH, Lohmar, Germany

[21] Appl. No.: 09/128,725

[22] Filed: Aug. 4, 1998

[30] Foreign Application Priority Data

Aug. 12, 1997 [IT] Italy ................... MI97A1931

[51] Int. Cl.[7] .................... F16D 31/00; F16D 13/00
[52] U.S. Cl. .................... 192/58.41; 192/70.14
[58] Field of Search .............. 192/58.42, 58.41, 192/70.14, 107 C

[56] References Cited

U.S. PATENT DOCUMENTS

| | | | |
|---|---|---|---|
| 1,958,319 | 5/1934 | Stanley | 192/70.14 |
| 4,913,267 | 4/1990 | Campbell et al. | 192/70.14 X |
| 4,982,808 | 1/1991 | Taureg et al. | 192/58.41 X |
| 5,094,328 | 3/1992 | Palmer | 192/58.42 X |
| 5,404,978 | 4/1995 | Hagiwara | 192/58.41 |
| 5,617,941 | 4/1997 | Takahashi et al. | 192/40.14 X |

FOREIGN PATENT DOCUMENTS

| | | |
|---|---|---|
| 19621237 | of 0000 | Germany . |
| 3702299 | of 0000 | Germany . |
| 4032245 | of 0000 | Germany . |
| 2135791 | 7/1972 | Germany . |
| 2200728 | 8/1988 | United Kingdom . |

OTHER PUBLICATIONS

Patent Abstracts of Japan No. M–1605 May 16, 1994 vol. 18/No. 254; "Viscous Coupling".
Patent Abstracts of Japan No. M–1027 Sep. 18, 1990 vol. 14 No. 426; "Coupling Device".

*Primary Examiner*—Charles Marmor
*Assistant Examiner*—Roger Pang
*Attorney, Agent, or Firm*—Francis N. Carten

[57] ABSTRACT

The invention relates to a viscous coupling such as it used in the driveline of a motor vehicle, wherein, due to a relative rotational movement between the inner plates 80 and the outer plates 90, the viscous medium is made to flow towards the axis of rotation X—X of the viscous coupling. To achieve this objective, the plates 80, 90 are provided with closed apertures 81, 91, whose delimiting faces 82, 83, 92, 93 are inclined relative to an imaginary radius R, so that, in the case of a rotational movement, the delimiting faces press the viscous medium inwardly, independently of the direction of rotation. This counter-acts a separation of viscous medium and air often caused by centrifugal forces at high speeds. As a result, the plates 80, 90 are moistened uniformly, which, in turn, reduces the amount of wear and increases the service life of the viscous coupling.

9 Claims, 6 Drawing Sheets

VISCOUS COUPLING

BACKGROUND OF THE INVENTION

The invention relates to a viscous coupling having and a hub are arranged to be rotatable relative to one another around an axis of rotation, and which form a closed unit. A set of inner plates are rotationally fast with the hub; having a set of outer plates which are attached in the housing in a rotationally fast way. The plates of at least one set of plates are movable in the direction of the axis of rotation. The inner plates and the outer plates are alternately arranged in the direction of the axis of rotation in a certain sequence while at least partially overlapping one another. The inner plates and/or the outer plates comprise apertures. A viscous medium at least partially fills the remaining spaces between the housing, the hub and the plates.

Viscous couplings are used in the drivelines of motor vehicles. For example, if slip occurs at the front wheels of a front wheel drive vehicle, the rear wheels can be connected by means of a viscous coupling in that the rear wheels are driven by a second gearbox output, a viscous coupling, a propeller shaft, a differential and sideshafts.

From DE-OS 21 35 791 it is known to provide the plates associated with one set of plates with apertures in the form of bores. The plates of the other set comprise slots. By designing the plates in such a way, it is possible to improve the torque capacity of such couplings. Furthermore, the degree of heat dissipation is increased by improving the circulation of the viscous medium.

At high viscous coupling speeds such as may occur if the viscous coupling is used in the driveline of a motor vehicle and if the vehicle travels at a high speed, centrifugal forces acting on the viscous medium separate the viscous medium and the air if, as usual, the viscous coupling is only partially filled with the viscous medium. In consequence, the inner regions of the plates, i.e. those regions positioned close to the axis of rotation, are either not moistened by the viscous medium or they are moistened to a lesser extent than the outer regions. As a result, wear symptoms occur at the inner regions at an earlier stage.

DE 37 02 299 C1 describes a viscous coupling wherein the inner and outer plates are provided with slots, with the slots of the inner plates and those of the outer plates intersecting one another. As a result, in the regions of intersection, there are formed cavities which extend from one plate to the next and which, in the case of a relative rotational movement of the plates relative to one another, move radially inwardly or outwardly, depending on the direction of rotation. This means that viscous medium is transported inwardly or outwardly, the purpose being to provide the coupling with a torque capacity which is dependent on the direction of rotation. However, when the viscous medium is transported outwardly, the separation of viscous medium and air at high coupling speeds is assisted, as a result of which plate wear is intensified.

SUMMARY OF THE INVENTION

It is the object of the present invention to provide a viscous coupling which ensures a largely uniform distribution of the viscous medium in the region of plate overlap when the sets of plates rotate relative to one another and which acts against a separation of viscous medium and air caused by centrifugal forces at high viscous coupling speeds, independently of the direction of rotation.

In accordance with the invention, the objective is achieved in that the apertures of the plates comprise two delimiting faces whose distance from an imaginary radius referring to the axis of rotation. This distance starts from a vertex positioned on the imaginary radius, and increases in the direction toward the axis of rotation, with the apertures, furthermore, being delimited by a base face which connects the delimiting faces.

Because both delimiting faces enclose an acute angle together with the imaginary radius, a force component acts in the direction toward the axis of rotation on the viscous medium. The force components acts independently of the direction of rotation when the sets of plates rotate relative to one another. This means that the viscous medium flows specifically inwardly towards the axis of rotation. This specific inward flow of the viscous medium acts against the viscous medium flow generated by the centrifugal forces at high viscous coupling speeds and it also effectively acts against the separation of viscous medium and air. Furthermore, the inner regions of the opposed faces of the plates are moistened with viscous medium to a greater extent, as a result of which the plates are subjected to less wear and the service life of the viscous coupling is improved.

The apertures of both the inner plates and of the outer plates are each distributed on at least one imaginary circular line around the axis of rotation. The apertures of the inner plates are offset relative to the apertures of the outer plates in the radial direction with reference to the axis of rotation in such a way that, when the hub is in a certain rotational position relative to the housing, the apertures overlap in certain regions and thus form through-flow channels between the apertures of the inner plates and the apertures of the outer plates.

Due to the fact that the apertures of the inner plates are offset relative to the apertures of outer plates, it is ensured that at the point in time when the apertures of adjoining plates partially overlap one another, the viscous medium is conveyed from the aperture of one plate into the aperture of another place, as a result of which the viscous medium flows inwardly over a longer distance. The advantages of the viscous medium flowing inwardly towards the axis of rotation are thus intensified.

The delimiting faces and the base faces of the apertures can be shaped differently to achieve different flow characteristics as a function of the rotational movement. By changing the angle enclosed by the delimiting faces and the imaginary radius, it is possible to vary the force component inwardly in the direction of the axis of rotation. As a result, it is possible to achieve different flow intensities of the viscous medium. By providing the delimiting faces and/or the base faces of the apertures with a curved shape, it is possible to achieve different flow conditions inside the apertures, as a result of which it is possible to improve the transport of the viscous medium from the aperture of one plate into the aperture of another plate.

According to a an advantageous embodiment it is proposed to achieve a thermal and mechanical stress relief. For this purpose, the plates, in addition to the apertures, are provided with slots which are positioned on an imaginary radius referring to the axis of rotation and which are open towards a circumferential face.

BRIEF DESCRIPTION OF THE DRAWINGS

Preferred embodiments will be described below with reference to the drawings wherein.

DETAILED DESCRIPTION

To the extent that the details of FIGS. 1 to 9 correspond to one another, they are given the same reference numbers, but increased by the factor 10.

Figure 1:
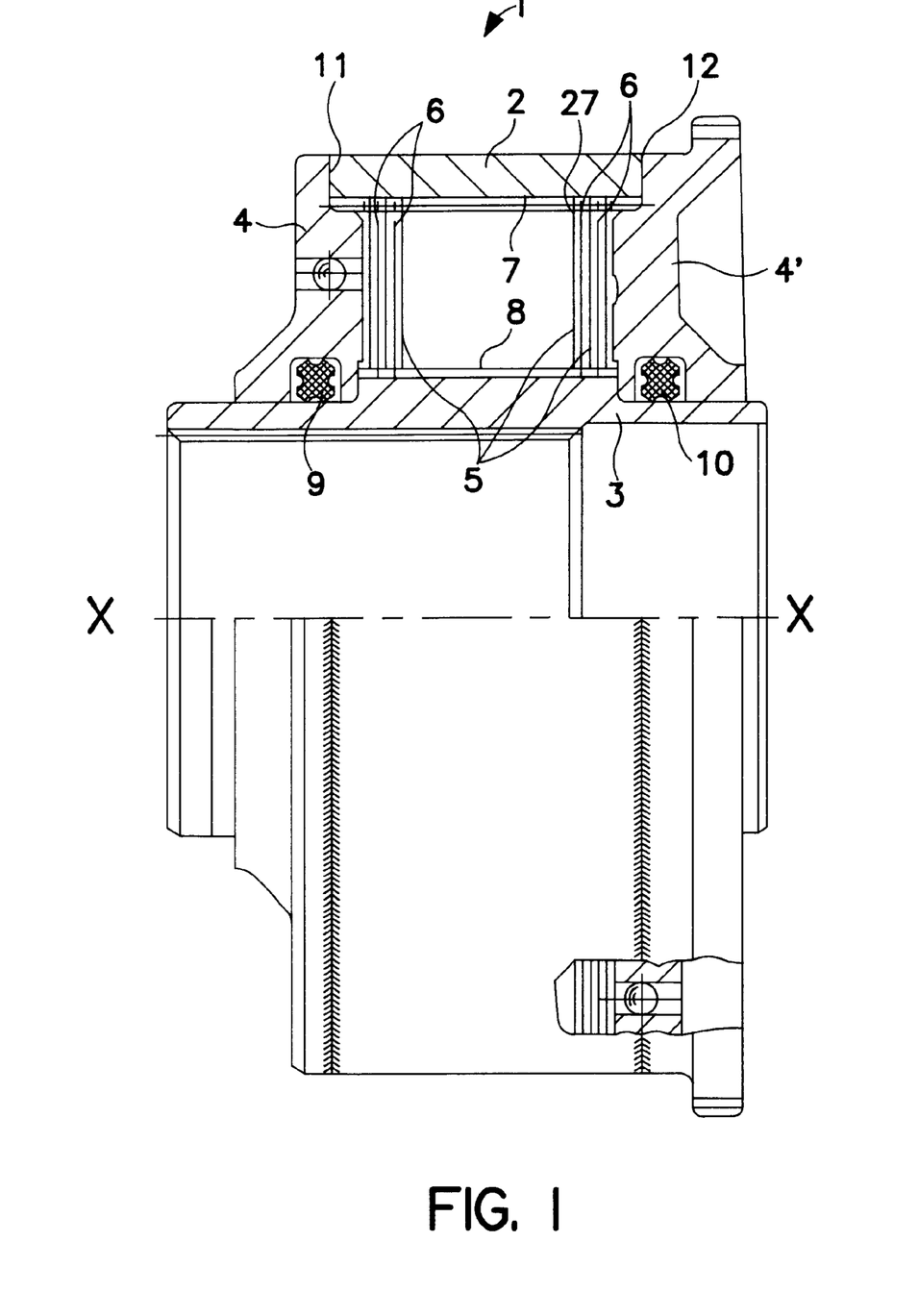
FIG. 1 is a side view of a viscous coupling which is partially shown in a longitudinal section.

The viscous coupling 1 according to FIG. 1 comprises the housing 2 and the hub 3 coaxially arranged relative to the housing 2, the cover 4, 4', as well as the outer plates 5 and the inner plates 6. The housing 2, on the inside of the cylindrical face, comprise axially extending teeth 7 receiving the outer plates 5 in a rotationally fast way, with the outer plates 5, on their circumference, being provided with corresponding teeth. The hub 3 is provided with a set of axially extending teeth 8 for connecting the internally toothed inner plates 6 in a rotationally fast way.

In this embodiment, the inner plates 6 are axially movable. The outer plates 5 are provided with spacing means 27 arranged between the plates and are axially immovably held by the covers 4, 4' in the housing The housing 2 is sealed relative to the hub 3 by seals 9 and 10. Furthermore, the cover 4, 4' is securely and sealingly connected to the housing 2 by welds 11, 12. The remaining space between the housing 2, the hub 3, the covers 4, 4' and the plates 5, 6 is at least partially filled with a viscous medium, especially high-viscosity silicone oil. When the hub 3 and the inner plates 6 rotate relative to the housing 2 and the outer plates 5, torque is transmitted. In this context, it is necessary to differentiate between two operating conditions characterized by different torque transmission mechanisms. In one operating condition, the shear effect of the viscous medium in the region of overlap of the plates 5, 6 leads to a transmission of torque. In another operating condition, the so-called condition of hump, the inner plates 6 come into contact with the outer plates 5, as a result of which a torque generated by friction between the plates 5, 6 is transmitted. If the hub 3 and housing 2 rotate at the same speed around the axis of rotation X—X without the hump condition having previously occurred so that the hub 3 does not rotate relative to the housing 2, no torque is transmitted.

Figure 2:
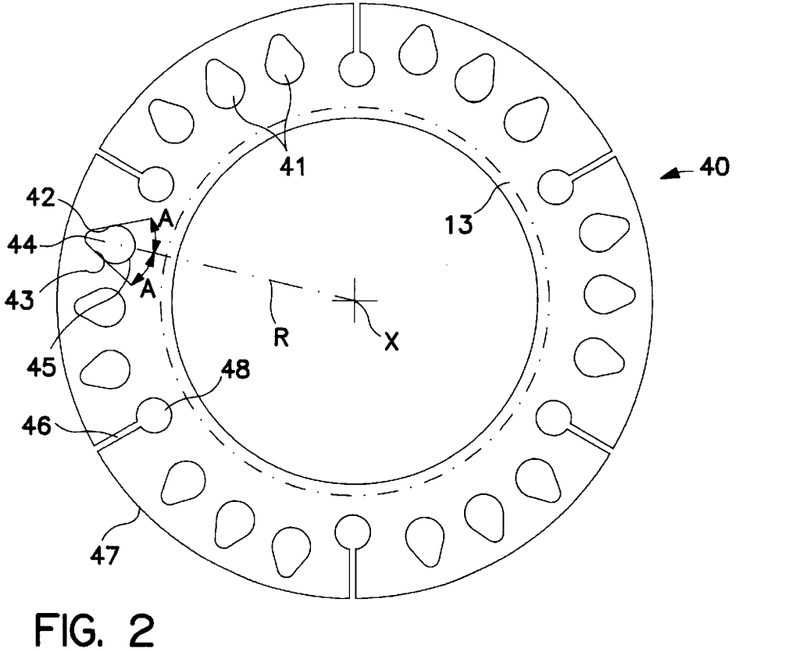
FIGS. 2, 4, and 6 are views of different embodiments of an inner plate.

FIG. 2 shows an inner plate 40 which corresponds to the inner plates 6 in FIG. 1. To achieve a rotationally fast, but axially movable connection with the hub 3, the inner plate 40 is provided with a set of teeth 13 of which, however, only the reference diameter is shown. On an imaginary circle around the axis of rotation X—X, there are arranged drop-shaped apertures 41. The distance between the delimiting faces 42, 43 and the imaginary radius R, starting from a vertex 44, increases in the inward direction for the purpose of avoiding a phase separation. The straight-flanked portions of the delimiting faces 42, 43 and the radius R enclose an acute angle "A". The base faces 45 in the form of circular cut-outs close the apertures 41. Furthermore, there are provided slots 46 distributed on the circumference of the inner plate, which are open towards the outer circumferential face 47 and having closed ends 48 each form a bore.

Figure 3:
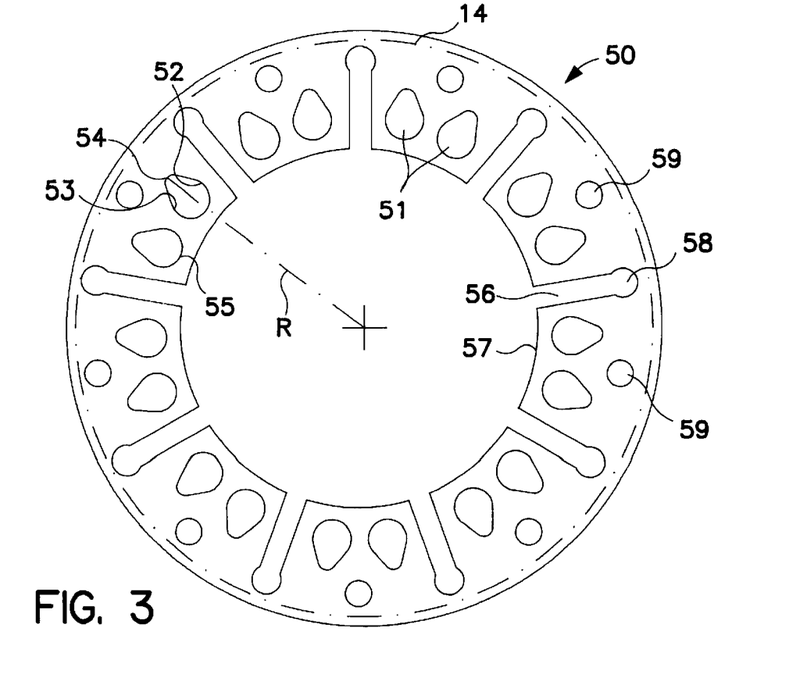
FIGS. 3, 5 and 7 are views of different embodiments of an outer plate.

The outer plate 50 illustrated in FIG. 3 corresponds to the outer plates 5 in FIG. 1 and is provided with outer teeth 14 to achieve a rotationally fast arrangement and axial spacing by means of bent teeth in the housing 2, with only the reference diameter of the teeth 4 being shown. The apertures 51 are also drop-shaped, like those of the inner plate 40 in FIG. 2. The delimiting faces 52, 53 and the base face 55 of an aperture 51 are designed in the same way as the corresponding delimiting faces 42, 43 and the base face 45 of the inner plate 40. The delimiting faces 52, 53 start from the vertex 54. The slots 56 are open towards the inner face 57 and outwardly closed by means of the end 58 in the form of a bore. Furthermore, circular apertures 59 are arranged on an imaginary circle whose diameter is greater than the diameter of the imaginary circle on which the drop-shaped apertures 51 are positioned.

Figure 4:
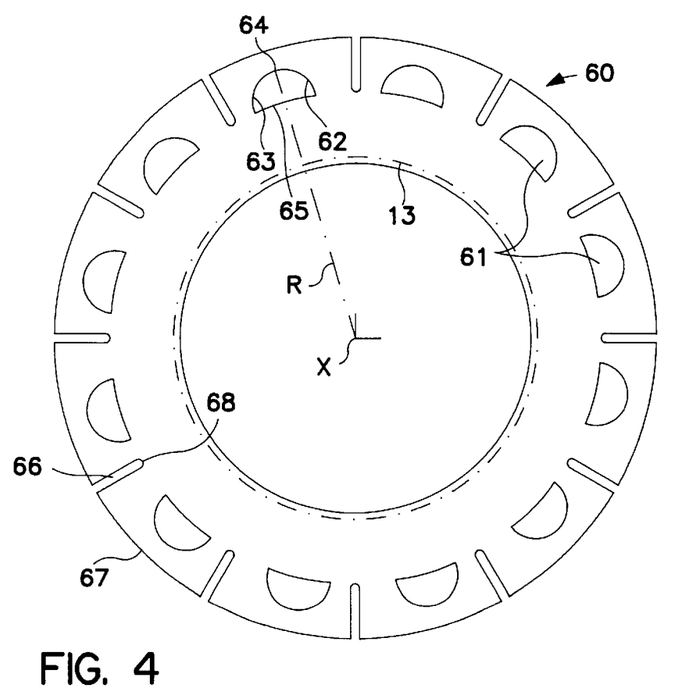
Figure 6:
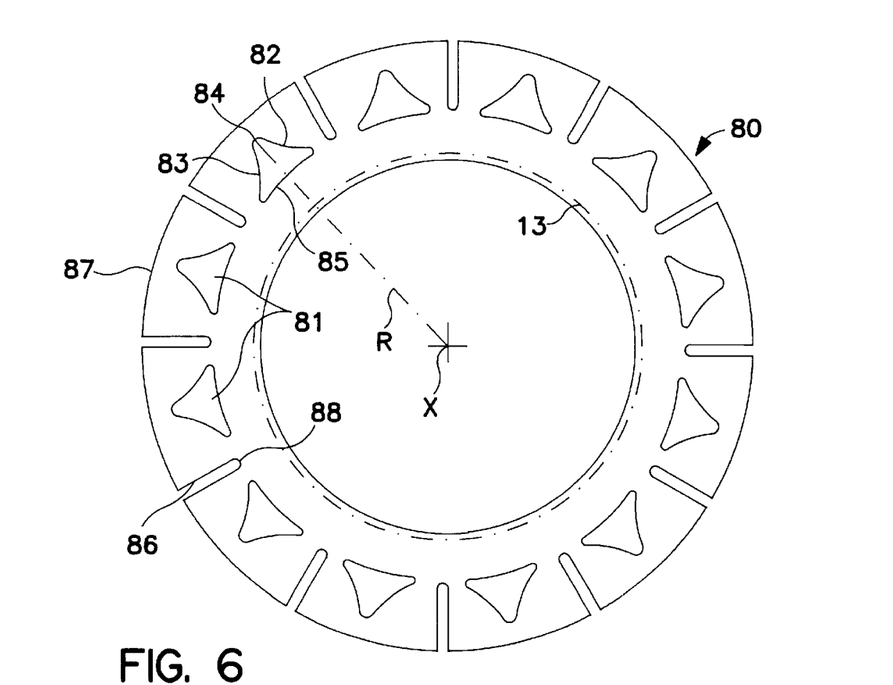

FIGS. 4 and 6 show further differently designed inner plates 60, 80 which each are provided with inner teeth 13.

Figure 5:
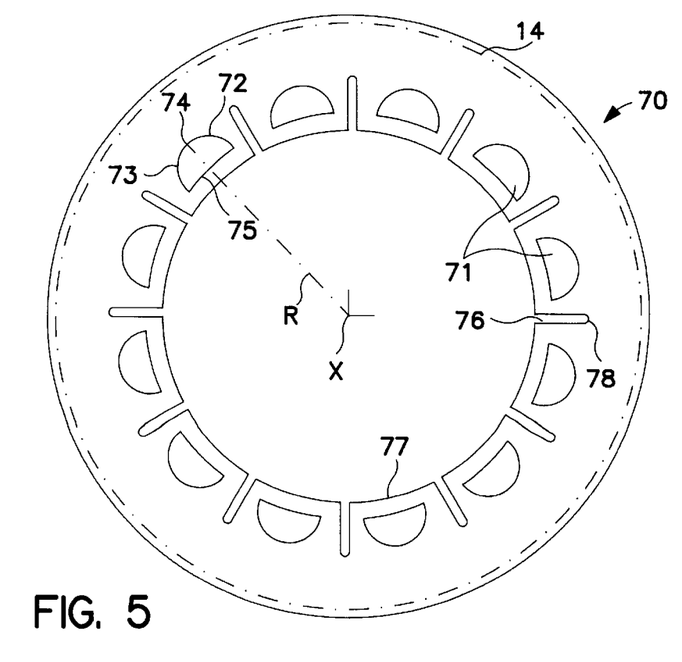
Figure 7:
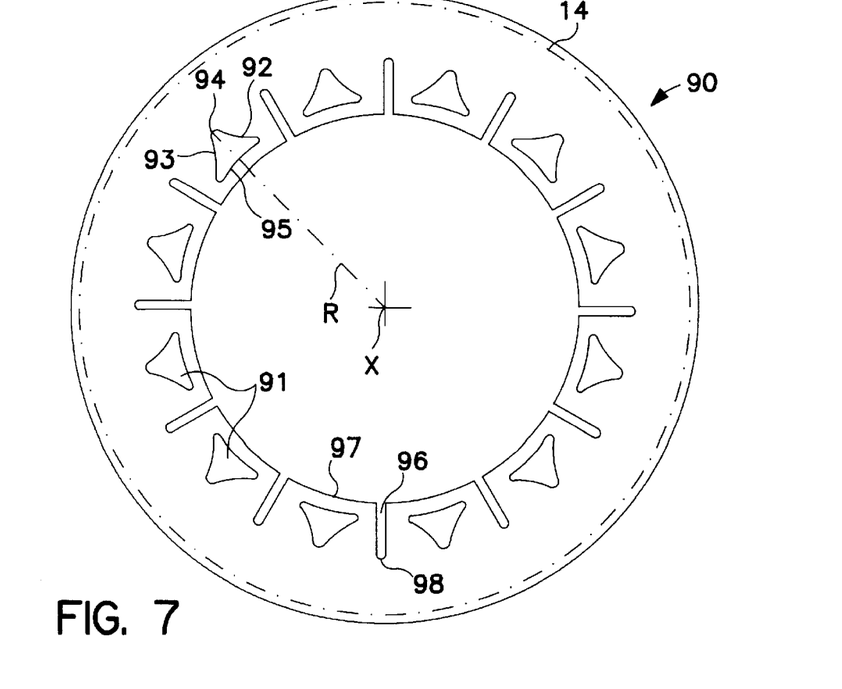

FIGS. 5 and 7 show correspondingly differently designed outer plates 70, 90 which are each provided with outer teeth 14.

The inner plate 60 according to FIG. 4 comprises apertures 61 wherein the distance between the delimiting faces 62, 63 and the imaginary radius R extends digressively. The apertures 61 alternate with circumferentially distributed slots 66 which are open towards the outer circumferential face 67 and which comprise a closed end 68.

The apertures 71 of the outer plate 70 according to FIG. 5 correspond to the apertures 61 of the inner plate 60. The apertures 71 are arranged on an imaginary circle around the axis of rotation X—X which circle has a smaller diameter than the circle on which the apertures of the respective inner plates are positioned.

The embodiment of the inner plate 80 according to FIG. 6 largely corresponds to the inner plate 60 of FIG. 4, but it is provided with apertures 81 in the case of which the distance between the delimiting faces 82, 83 and the radius R extends progressively.

The apertures 91 of the outer plate 90 according to FIG. 7 correspond to the apertures 81 of the inner plate 80. The apertures 91 are positioned on an imaginary circle around the axis of rotation X—X, which circle has a smaller diameter than the circle on which the apertures of the respective inner plates are positioned.

Figure 8:
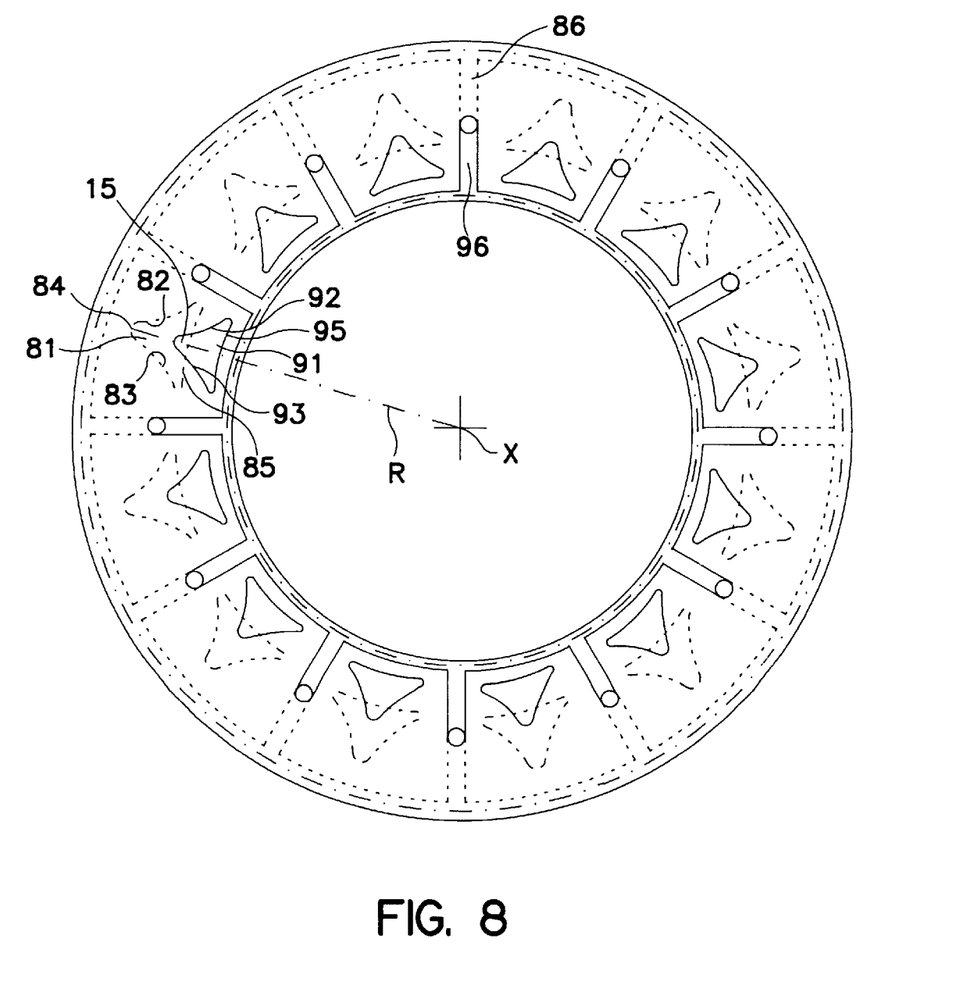
FIG. 8 is a view showing an overlap of an outer plate according to FIG. 7 and an inner plate according to FIG. 6.

In FIG. 8, the inner plate 80 and the outer plate 90 according to FIGS. 6 and 7 are shown in overlap. In the relative rotational position as shown, through-flow channels 15 are obtained due to the partial overlap of the apertures 81 and 91. If the inner plate 80 rotates anticlockwise, the viscous medium is pressed by the delimiting faces 82 inward towards the axis of rotation X—X and at the time of overlap of the apertures 81 and 91 the viscous medium flows through the through-channel 15 from the aperture 81 into the aperture 91 of the outer plate 90 from where it is conveyed further inwardly.

Figure 9:
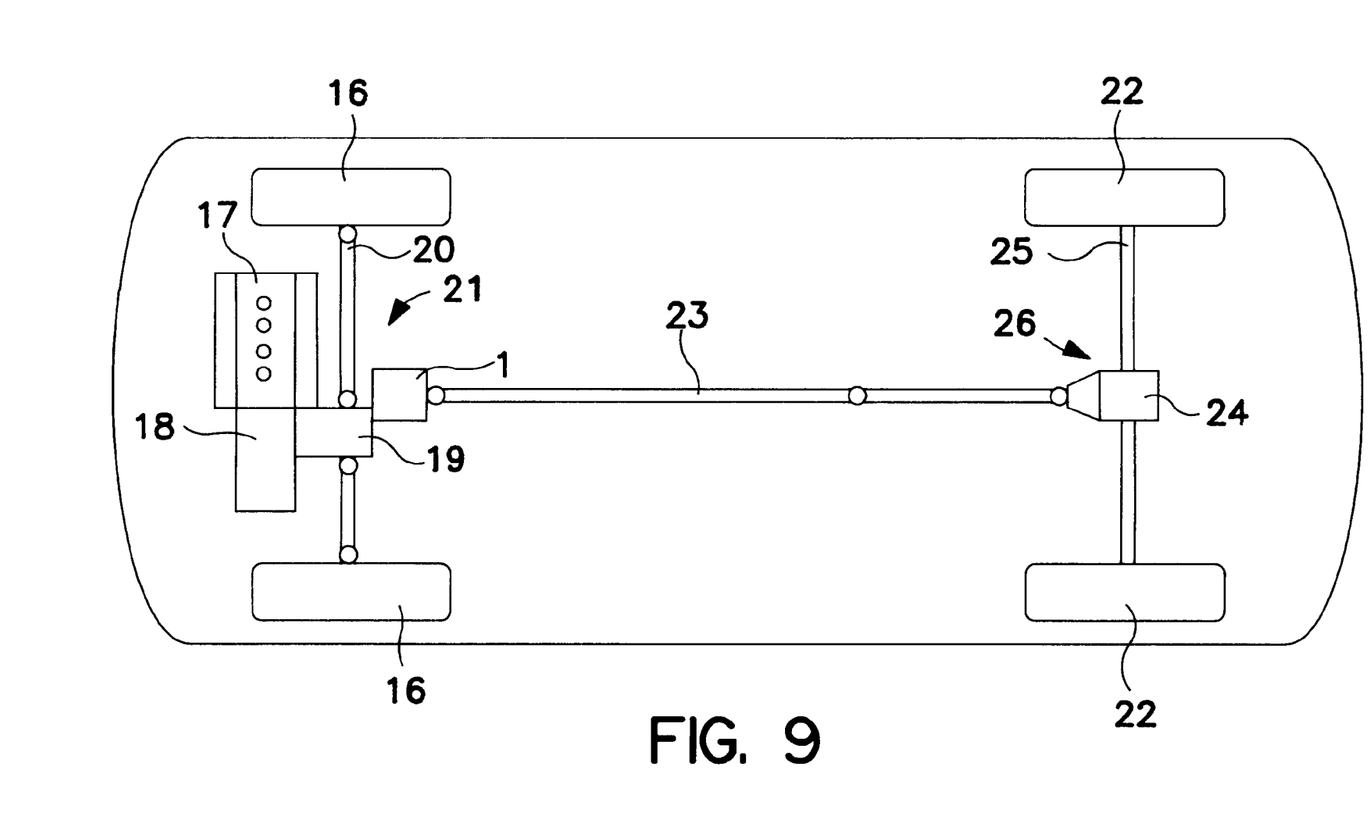
FIG. 9 shows the drive concept of a front wheel drive vehicle with one possible application for a viscous coupling.

FIG. 9 shows the drive concept of a front wheel drive vehicle. The front wheels 16 are driven by the engine 17 via the gearbox 18, the differential 19 and the sideshafts 20 of the front axle 21. Under normal driving conditions, the rear wheels 22 only roll along, so that the inner plates and outer plates do not rotate relative to one another in the viscous coupling 1. If the front wheels 16 are subject to slip due to inadequate adhesive friction relative to the road surface, a rotational movement of the inner plates relative to the outer plates does occur in the viscous coupling 1, so that the rear wheels 22 are driven as well by means of the propeller shaft 23, the differential 24 and the sideshafts 25 of the rear axle 26.

Preferred embodiments have been disclosed. However, a worker in this art would recognize the modifications that come within the scope of this invention. Thus, the following claims should be studied.

What is claimed is:

1. A viscous coupling comprising:

a housing and a hub arranged around an axis of rotation so as to be rotatable relative to one another and to form a closed unit;

a set of inner plates which are rotationally fast with said hub;

a set of outer plates which are attached in said housing in a rotationally fast way, with said plates of at least one set of said inner and outer plates being movable in the direction of said axis of rotation and with said inner plates and said outer plates being alternately arranged in the direction of the axis of rotation in a certain sequence while at least partially overlapping one another and both said inner plates and said outer plates have apertures;

a viscous medium at least partially filling a remaining space between said housing, said hub and said plates;

said apertures of said plates having two delimiting faces whose distance from an imaginary radius referring to the axis of rotation, said distance starting from a vertex positioned on said imaginary radius, increases in the direction towards said axis of rotation, with said apertures being delimited by a base face which connects said delimiting face; and wherein said apertures of both said inner plates and said outer plates are each distributed on at least one imaginary circular line around said axis of rotation, with said apertures of said inner plates being offset relative to said apertures of said outer plates in the radial direction with reference to said axis of rotation in such a way that, when said hub is in a certain rotational position relative to said housing, said apertures overlap in certain regions and thus form through-flow channels between said apertures of said inner plates and said apertures of said outer plates.

2. A viscous coupling according to claims 1, wherein a distance between each of said delimiting faces and said imaginary radius extends linearly.

3. A viscous coupling according to claims 1, wherein a distance between each of said delimiting faces and said imaginary radius extends progressively.

4. A viscous coupling according to claims 1 wherein a distance between each of said delimiting faces and said imaginary radius extends digressively.

5. A viscous coupling according to claims 1, wherein said base faces of said apertures extend tangentially relative to an imaginary circular line around said axis of rotation.

6. A viscous coupling according to claim 1, wherein said base faces of said apertures are curved.

7. A viscous coupling according to claim 1, wherein at least one set of said inner plates and said outer plates have slots positioned on an imaginary radius referring to said axis of rotation.

8. A viscous coupling according to claim 7, wherein said slots are in said inner plates and being open towards a circumferential face.

9. A viscous coupling according to claim 7, wherein said slots are in said outer plates and being open towards an inner face.

* * * * *

UNITED STATES PATENT AND TRADEMARK OFFICE
CERTIFICATE OF CORRECTION

PATENT NO. : 6,056,097
DATED : May 2, 2000
INVENTOR(S) : Hofer, Manfred, & Morawetz, Rudolf It is certified that error appears in the above-identified patent and that said Letters Patent is hereby corrected as shown below:

<u>Title page,</u>
Change the name of the assignee from "GKN ViscoDrive GmbH" to -- GKN Viscodrive GmbH --.

Signed and Sealed this

Eighteenth Day of September, 2001

*Attest:*

NICHOLAS P. GODICI
*Attesting Officer*    *Acting Director of the United States Patent and Trademark Office*